United States Patent
Ueno et al.

(10) Patent No.: US 7,948,501 B2
(45) Date of Patent: May 24, 2011

(54) DISPLAY CONTROL APPARATUS AND METHOD UNDER PLURAL DIFFERENT COLOR SPACES

(75) Inventors: Akira Ueno, Akiruno (JP); Yoshinobu Tanaka, Hachioji (JP); Tetsuya Toyoda, Hachioji (JP)

(73) Assignee: Olympus Corporation, Tokyo (JP)

( * ) Notice: Subject to any disclaimer, the term of this patent is extended or adjusted under 35 U.S.C. 154(b) by 1080 days.

(21) Appl. No.: 11/072,484

(22) Filed: Mar. 4, 2005

(65) Prior Publication Data

US 2005/0200922 A1  Sep. 15, 2005

(30) Foreign Application Priority Data

Mar. 9, 2004  (JP) ................. 2004-066034

(51) Int. Cl.
G09G 5/02 (2006.01)
G06K 9/00 (2006.01)

(52) U.S. Cl. ........ 345/589; 345/590; 345/592; 345/593; 382/162

(58) Field of Classification Search ........... 345/589, 345/590, 592, 593; 382/162
See application file for complete search history.

(56) References Cited

U.S. PATENT DOCUMENTS

| | | | |
|---|---|---|---|
| 3,864,723 A * | 2/1975 | Carpenter | 348/652 |
| 3,961,361 A * | 6/1976 | Avins et al. | 348/603 |
| 3,980,822 A * | 9/1976 | Suzuki et al. | 348/380 |
| 4,051,521 A * | 9/1977 | Harwood | 348/659 |
| 4,424,528 A * | 1/1984 | Karlock et al. | 348/575 |
| 4,509,210 A * | 4/1985 | Kohn | 455/349 |
| 4,510,521 A * | 4/1985 | Ruprecht et al. | 348/646 |
| 4,627,004 A * | 12/1986 | Cool et al. | 358/1.9 |
| 5,153,937 A * | 10/1992 | Wobermin et al. | 345/592 |
| 5,627,599 A * | 5/1997 | Hong | 348/643 |
| 5,732,151 A * | 3/1998 | Moon et al. | 382/167 |
| 5,742,727 A * | 4/1998 | Kanota et al. | 386/26 |
| 5,892,847 A * | 4/1999 | Johnson | 382/232 |
| 5,907,658 A * | 5/1999 | Murase et al. | 386/95 |
| 6,057,891 A * | 5/2000 | Guerin et al. | 348/572 |
| 6,088,137 A * | 7/2000 | Tomizawa | 358/538 |
| 6,092,023 A * | 7/2000 | Kunishige | 702/1 |
| 6,226,010 B1 * | 5/2001 | Long | 345/594 |
| 6,392,764 B1 * | 5/2002 | Eschbach et al. | 358/522 |

(Continued)

FOREIGN PATENT DOCUMENTS

CN  1407813  4/2003

(Continued)

OTHER PUBLICATIONS

Chinese Office Action for Patent Application No. 2005100535623, dated Apr. 20, 2007 (12 pgs.) with translation (12 pgs.).

(Continued)

*Primary Examiner* — Xiao M Wu
*Assistant Examiner* — David T Welch
(74) *Attorney, Agent, or Firm* — John C. Pokotylo; Straub & Pokotylo (57) ABSTRACT

A display control apparatus displays image data expressed under a plurality of different color spaces. A discriminating section discriminates color space information on image data to be displayed. A gain switching section switches between gains in accordance with a result of the discrimination and sets a gain adapted for the image data to be displayed. An amplifying section amplifies an image signal, generated based on the image data and relating to at least a color difference, in accordance with the gain set by the gain switching section.

12 Claims, 7 Drawing Sheets

U.S. PATENT DOCUMENTS

| | | | |
|---|---|---|---|
| 6,429,901 B1 * | 8/2002 | Kiyose et al. | 348/500 |
| 6,466,224 B1 * | 10/2002 | Nagata et al. | 345/592 |
| 6,583,799 B1 * | 6/2003 | Manolis et al. | 715/838 |
| 6,647,141 B1 * | 11/2003 | Li | 382/162 |
| 2002/0094121 A1 * | 7/2002 | Itani et al. | 382/162 |
| 2003/0002095 A1 * | 1/2003 | Gruzdev et al. | 358/518 |
| 2003/0011612 A1 * | 1/2003 | Luo et al. | 345/589 |
| 2003/0115613 A1 * | 6/2003 | Jang et al. | 725/151 |
| 2003/0234880 A1 * | 12/2003 | Fukui | 348/272 |
| 2004/0066979 A1 * | 4/2004 | Gindele et al. | 382/274 |
| 2004/0119843 A1 * | 6/2004 | Hoshuyama | 348/222.1 |
| 2004/0197105 A1 * | 10/2004 | Khatana et al. | 398/173 |
| 2010/0149418 A1 * | 6/2010 | Freed et al. | 348/572 |

FOREIGN PATENT DOCUMENTS

| | | |
|---|---|---|
| EP | 0800150 | 10/1997 |
| JP | 09-270927 | 10/1997 |
| JP | 10-155094 | 6/1998 |
| JP | 2003-87587 | 3/2003 |
| JP | 2003-153297 | 5/2003 |
| JP | 2003-324553 | 11/2003 |
| JP | 2004-40371 | 2/2004 |

OTHER PUBLICATIONS

Notice of Reasons for Rejection for Japanese Patent Application No. 2005-062858, mailed Dec. 14, 2010 (3 pgs.) with translation (4 pgs.).

* cited by examiner

DISPLAY CONTROL APPARATUS AND METHOD UNDER PLURAL DIFFERENT COLOR SPACES

CROSS-REFERENCE TO RELATED APPLICATIONS

This application is based upon and claims the benefit of priority from prior Japanese Patent Application No. 2004-066034, filed Mar. 9, 2004, the entire contents of which are incorporated herein by reference.

BACKGROUND OF THE INVENTION

1. Field of the Invention

The present invention relates to a display control apparatus and method under a plurality of different color spaces.

2. Description of the Related Art

At present, it is known that RGB color spaces representing colors have a plurality of definitions. For example, in connection with digital cameras, Exif (Exchangeable image format for digital still cameras) is designated as a standard of the record image file format. In this format, an RGB color space called sRGB is adopted as a standard color space of images.

In contrast, in the field of commercial printing, in particular, a color space called ADOBE® (Registered Trademark) RGB color image encoding is used as a practical standard color space. Other color spaces are also positively proposed in accordance with the use. Under these circumstances, there is an increasing demand for a digital camera, which can deal with color spaces other than sRGB.

Figure 7:
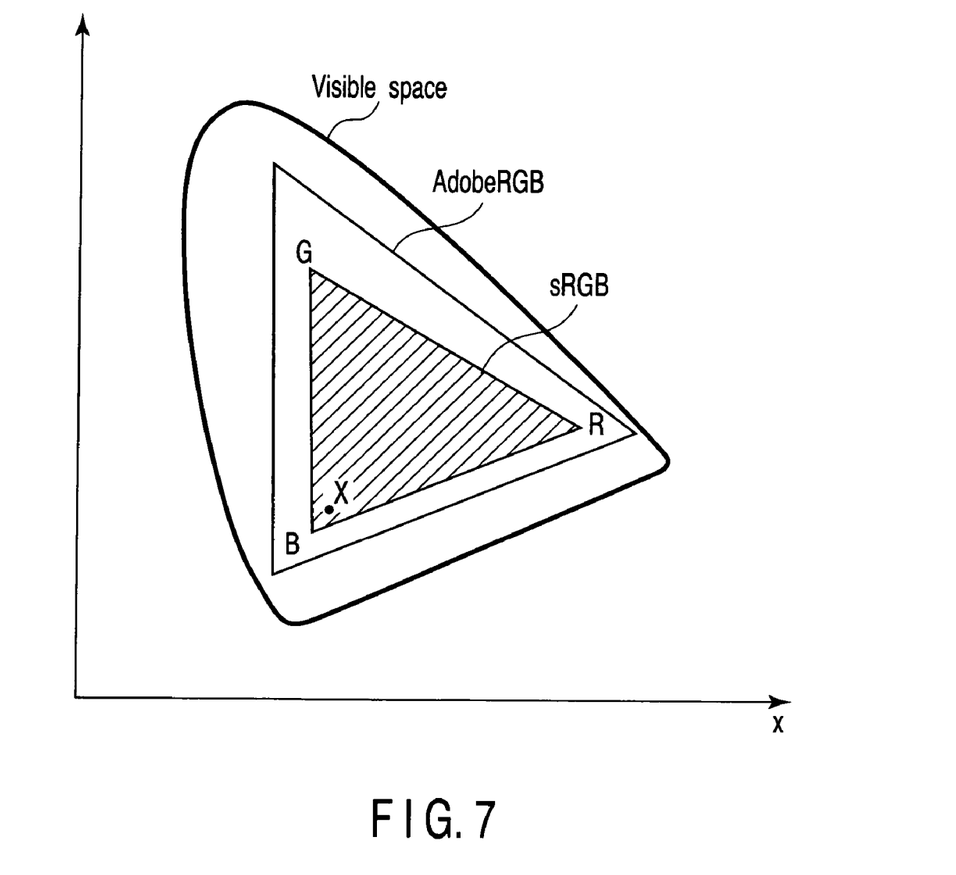
FIG. 7 is a diagram for explaining a problem of the conventional art.

However, if a display apparatus displays an image taken under a RGB space of a different definition from its own, the displayed color is different from that originally taken, because of the difference in definition of RGB. For example, the display apparatus of a digital camera is generally adapted for image data under sRGB. Therefore, if an image of a color expressed under ADOBE® RGB color image encoding is displayed on the digital camera, the displayed color has a lower chroma than that of the corresponding color under sRGB, as shown in FIG. 7 (point X).

BRIEF SUMMARY OF THE INVENTION

An object of the present invention is to provide a display control apparatus and method, which allow images to be displayed in proper colors with a simple structure, even if image data represented under different color spaces are dealt with.

According to a first aspect of the present invention, there is provided a display control apparatus to display image data expressed under a plurality of different color spaces, the apparatus comprising: a discriminating section which discriminates color space information on image data to be displayed; a gain switching section which switches between gains in accordance with a result of the discrimination and sets a gain adapted for the image data to be displayed; and an amplifying section which amplifies an image signal, generated based on the image data and relating to at least a color difference, in accordance with the gain set by the gain switching section.

According to a second aspect of the present invention, there is provided a display control apparatus to display image data expressed under a plurality of different color spaces, the apparatus comprising: a discriminating section which discriminates color space information on image data to be displayed; a palette selecting section which selects a desired color palette from a plurality of color palettes relating to a display pattern in accordance with a result of the discrimination; a mixing section which mixes the image data with the color palette relating to the display pattern selected by the palette selecting section, thereby generating display image data; a gain switching section which switches between gains in accordance with the result of the discrimination and sets a gain adapted for the display image data; and an amplifying section which amplifies an image signal, generated based on the display image data and relating to at least a color difference, in accordance with the gain set by the gain switching section.

According to a third aspect of the present invention, there is provided a display control apparatus to display image data expressed under a plurality of different color spaces, the apparatus comprising: discriminating means for discriminating color space information on image data to be displayed; gain switching means for switching between gains in accordance with a result of the discrimination and sets a gain adapted for the image data to be displayed; and amplifying means for amplifying an image signal, generated based on the image data and relating to at least a color difference, in accordance with the gain set by the gain switching means.

According to a fourth aspect of the present invention, there is provided a display control apparatus to display image data expressed under a plurality of different color spaces, the apparatus comprising: discriminating means for discriminating color space information on image data to be displayed; palette selecting means for selecting a desired color palette from a plurality of color palettes relating to a display pattern in accordance with a result of the discrimination; mixing means for mixing the image data with the color palette relating to the display pattern selected by the palette selecting means, thereby generating display image data; gain switching means for switching between gains in accordance with the result of the discrimination and sets a gain adapted for the display image data; and amplifying means for amplifying an image signal, generated based on the display image data and relating to at least a color difference, in accordance with the gain set by the gain switching means.

According to a fifth aspect of the present invention, there is provided a display control method for displaying image data expressed under a plurality of different color spaces, the method comprising: discriminating under what color space image data is expressed; switching between gains in accordance with a result of the discrimination and setting a gain for use in displaying the image data; and amplifying the image data using the gain set in accordance with the result of the discrimination of the image data.

According to a sixth aspect of the present invention, there is provided a display control method for displaying image data expressed under a plurality of different color spaces, the method comprising: discriminating under what color space image data is expressed; selecting a color palette relating to a display pattern from a plurality of color palettes in accordance with a result of the discrimination; mixing the image data with the selected color palette relating to the display pattern; switching between gains in accordance with the result of the discrimination and setting a gain for use in displaying the image data; and amplifying the image data using the gain set in accordance with the result of the discrimination of the image data.

According to a seventh aspect of the present invention, there is provided a display control method for displaying image data expressed under a plurality of different color spaces, the method comprising: discriminating under what color space image data is expressed; selecting an image processing parameter relating to color space processing when processing the image data based on a result of discrimination of the image data; processing the image data based on the selected image processing parameter; selecting a color palette relating to a display pattern from a plurality of color palettes in accordance with the result of the discrimination; switching between gains in accordance with the result of the discrimination of the image data and setting a gain for use in displaying the image data; amplifying the image data using the gain set in accordance with the result of the discrimination of the image data; and displaying the amplified image data using the set gain.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
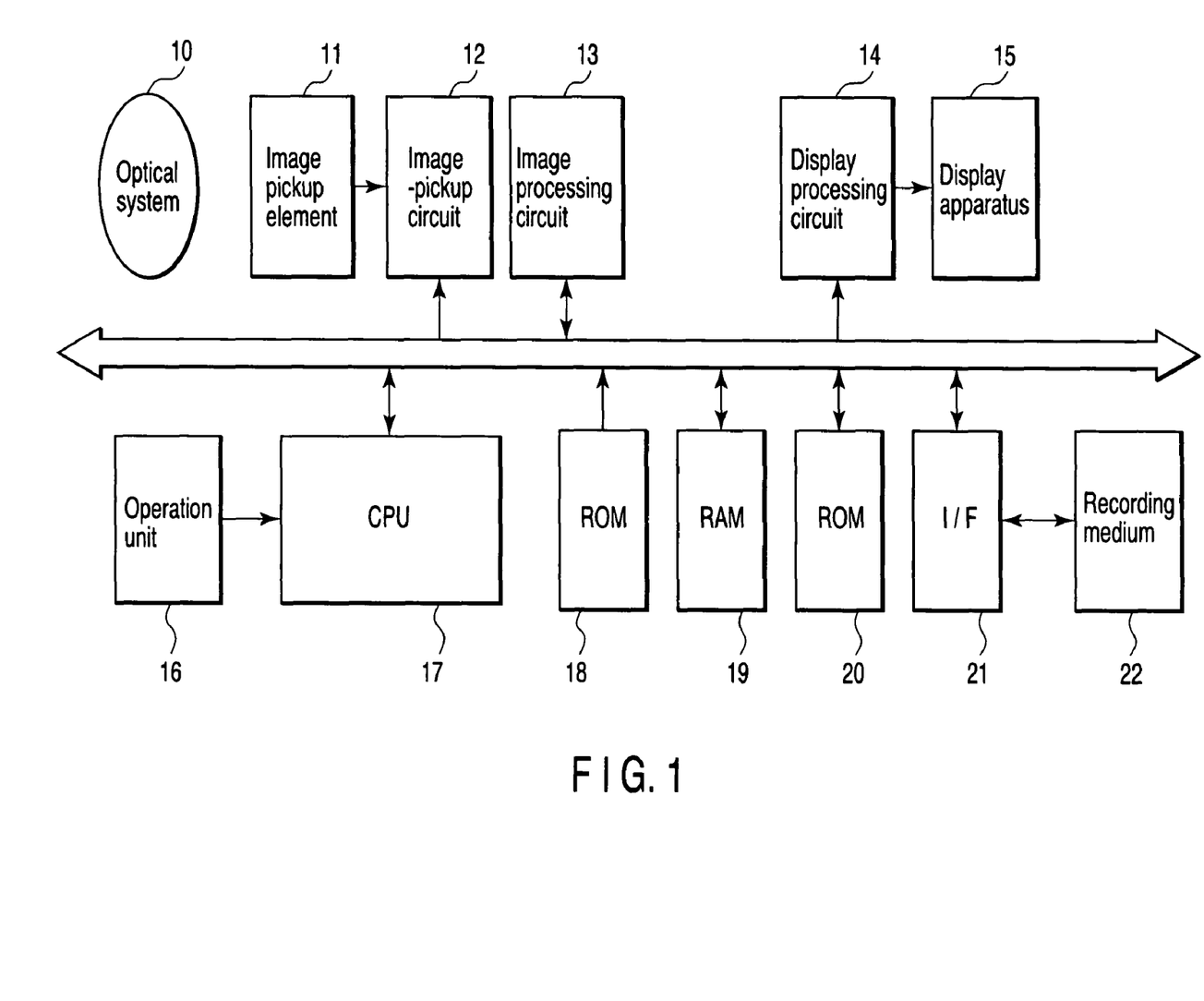
FIG. 1 is a block diagram showing an overall configuration of a digital camera, to which a display control apparatus of the present invention is applied.

An embodiment of the present invention will be described below in detail with reference to the accompanying drawings. FIG. 1 is a block diagram showing an overall configuration of a digital camera, to which a display control apparatus of the present invention is applied. The digital camera includes: an optical system 10 to capture an image of a target object; an image pickup element 11, comprising a CCD, which converts the captured image to an electric signal, i.e., image data; an image-pickup circuit 12 which controls an image-pickup operation; an image processing circuit 13 for subjecting the image data to color correction and gamma correction; a RAM 19 to temporarily store the image data; a ROM 20 to store gain data (to be described later); a ROM 18 to store color palette data and OSD (on screen display) data (to be described later); an interface (I/F) 21, which communicates with a recording medium 22, such as a memory card detachably inserted in the digital camera to record the image data; a display processing circuit 14, which subjects the image data to a predetermined display process; a display apparatus 15, which displays the processed image data and information relating to color spaces; an operation unit 16, which has a release SW to instruct a start or end of image pickup, and by which an image file name to be displayed can be set as information on the color space; and a CPU 17 which controls all the above units.

Figure 2:
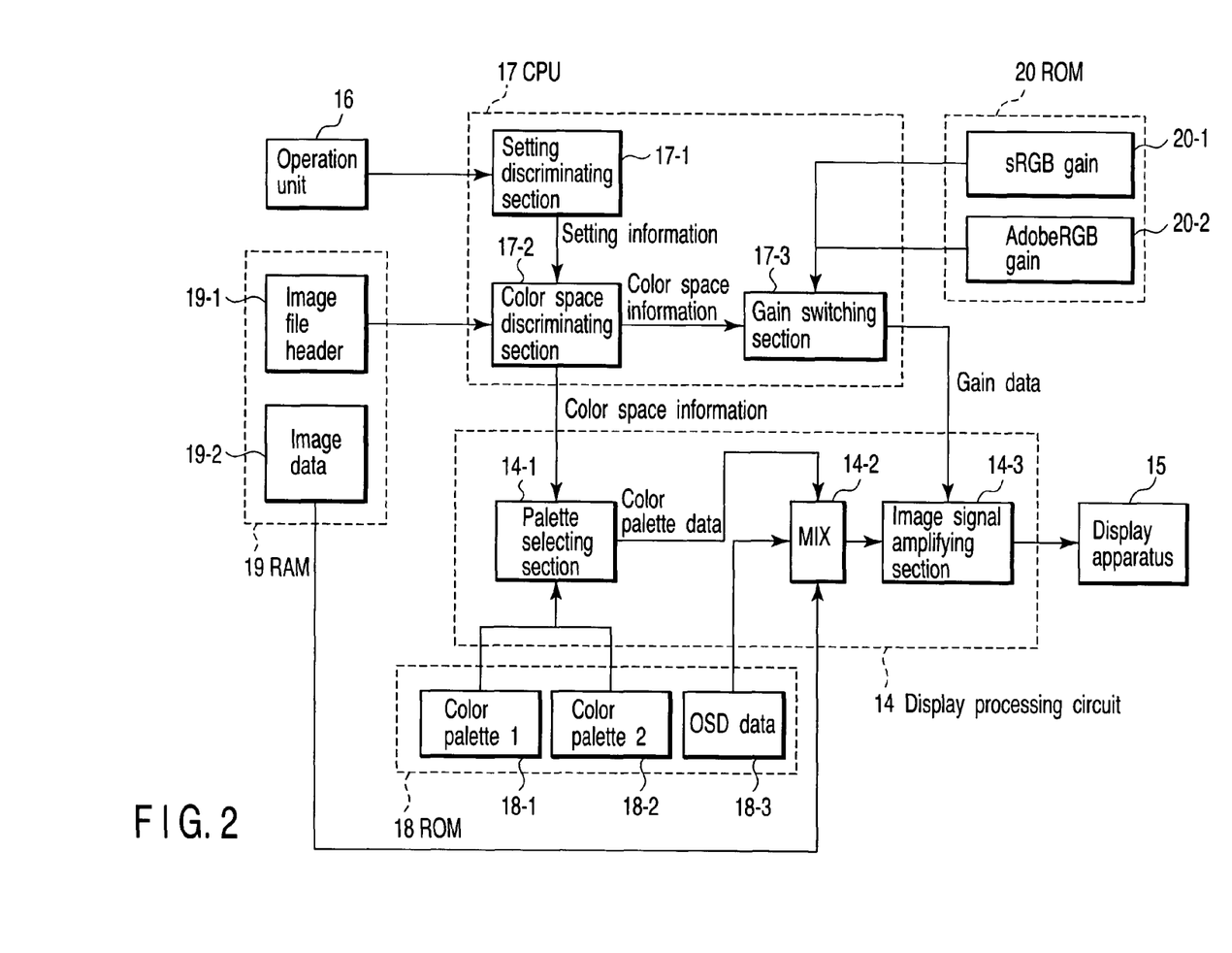
FIG. 2 is a diagram showing schematic configurations of main blocks illustrated in FIG. 1.

FIG. 2 is a diagram showing schematic configurations of main blocks illustrated in FIG. 1. The RAM 19 stores an image file header 19-1 and image data 19-2. The ROM 20 stores gain data 20-1 for sRGB and gain data 20-2 for ADOBE® RGB color image encoding. These are preset to fixed values. The ROM 18 stores a plurality of color pallets relating to display patterns: a color pallet 1 (18-1) and a color pallet 2 (18-2), having different color saturations, and an OSD data 18-3 representing text data for menu display, by which the user selects conditions of photographing or playback, for example.

The CPU 17 includes a setting discriminating section 17-1, a color space discriminating section 17-2 and a gain switching section 17-3. The setting discriminating section 17-1 discriminates setting conditions of the operating unit 16. The color space discriminating section 17-2 discriminates color space settings based on the discriminated setting conditions and outputs color space information. More specifically, the color space discriminating section 17-2 discriminates kinds of color space based on file management information including information recorded in the header of an image file, the name of an image file to be displayed, or associating information of an image file to be displayed. Based on the color space information, the gain switching section 17-2 switches gains of image data (photographing and playback) to be displayed.

The display processing circuit 14 includes a palette selecting section 14-1, a mixing section (MIX) 14-2 and an image signal amplifying section 14-3. The palette selecting section 14-1 selects either the color palette 1 (18-1) or the color palette 2 (18-2) based on the color space information output from the color space discriminating section 17-2. The MIX section 14-2 mixes the color palette data indicative of which color palette is selected, the OSD data 18-2 and image data 19-2 read from the RAM 19 as image data to be displayed. The image signal amplifying section 14-3 amplifies an image signal, which at least relates to color difference, of an output from the MIX section 14-2 at the amplification ratio in accordance with the gain data supplied from the gain switching section 17-3.

Figure 3A:
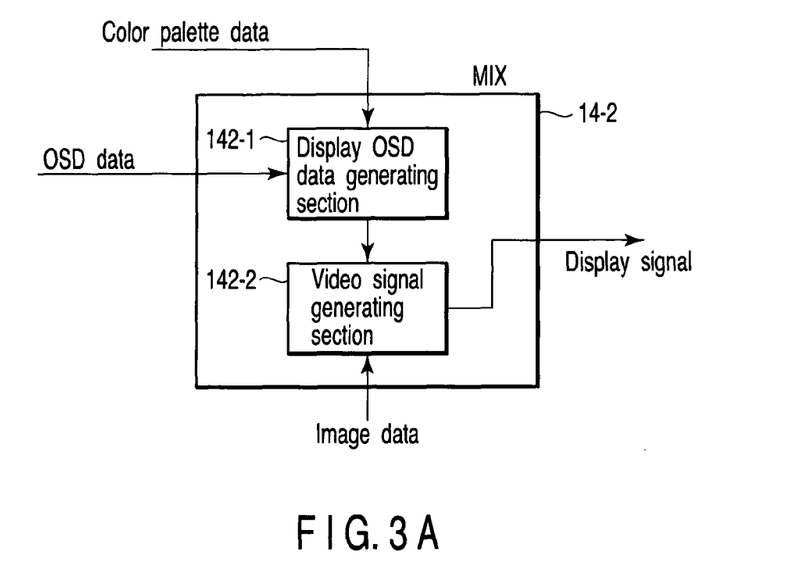
FIG. 3A is a block diagram showing a configuration of a synthesizing section.
Figure 3B:
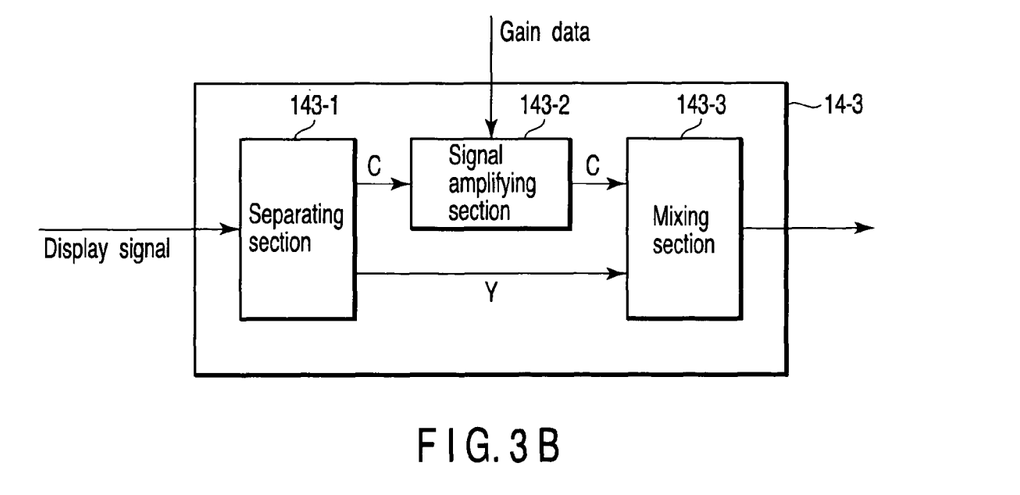
FIG. 3B is a block diagram showing a configuration of an image signal amplifying section.

FIG. 3A shows a configuration of the MIX section 14-2 shown in FIG. 2, and FIG. 3B shows a configuration of the image signal amplifying section 14-3. As shown in FIG. 3A, the OSD data input to the MIX section 14-2 is converted to display OSD data by a display OSD data generating section 142-1, based on the color palette data supplied from the palette data selecting section 14-1. The OSD data and the image data are input to a video signal generating section 142-2 and converted to a display signal including a luminance signal and a color difference signal.

The display signal is input to the image signal amplifying section 14-3. As shown in FIG. 3B, the display signal is separated by a separating section 143-1 into a luminance signal Y and a color difference signal C. The color difference signal C is amplified by the signal amplifying section 143-2 on the basis of the gain data supplied from the gain switching section 17-3. The amplified color difference signal C is mixed with the luminance signal Y again by a mixing section 143-3 and output to the display apparatus 15.

Figure 4:
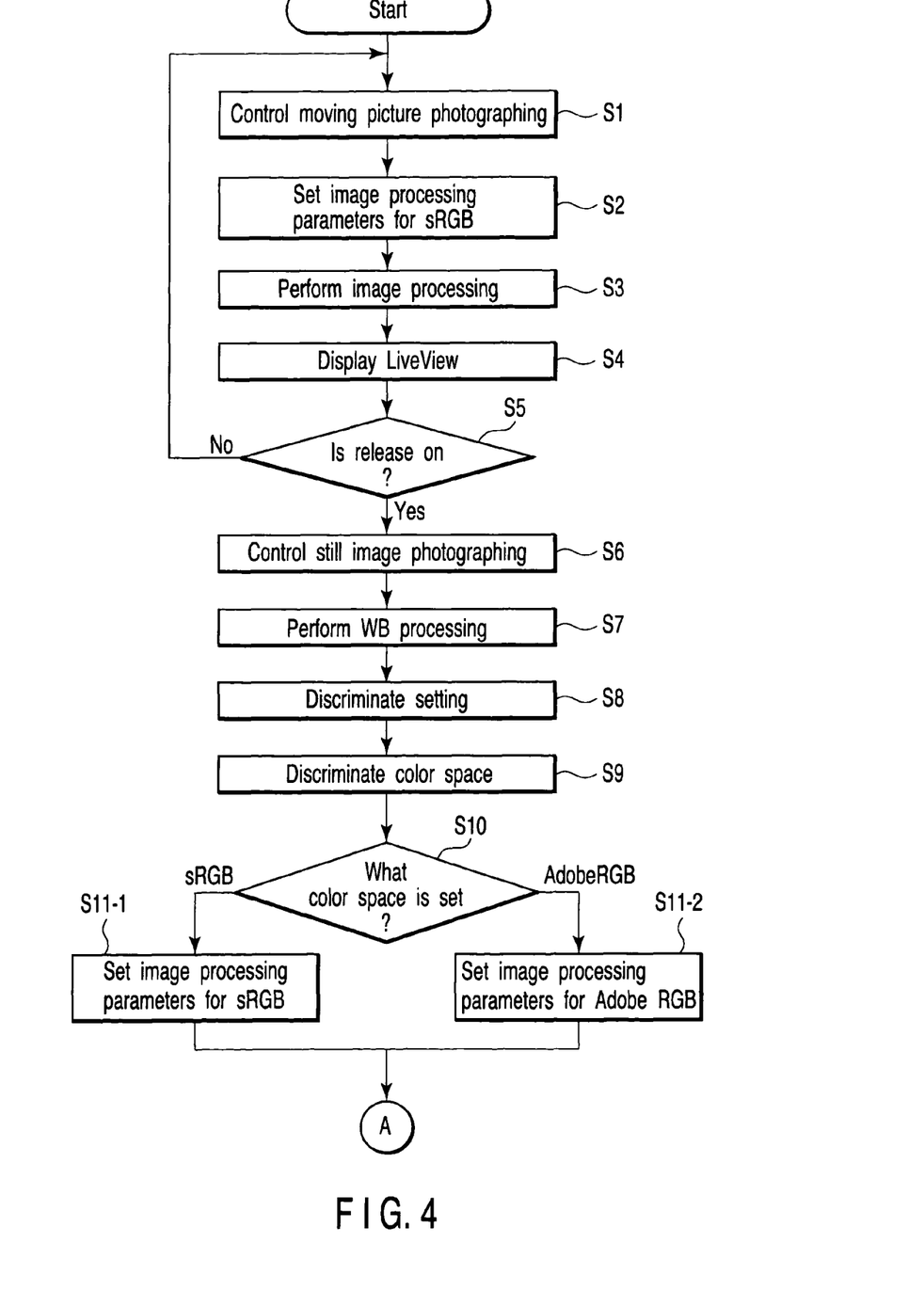
FIG. 4 is the first half of a flowchart for explaining an operation of the digital camera in a photographing time.
Figure 5:
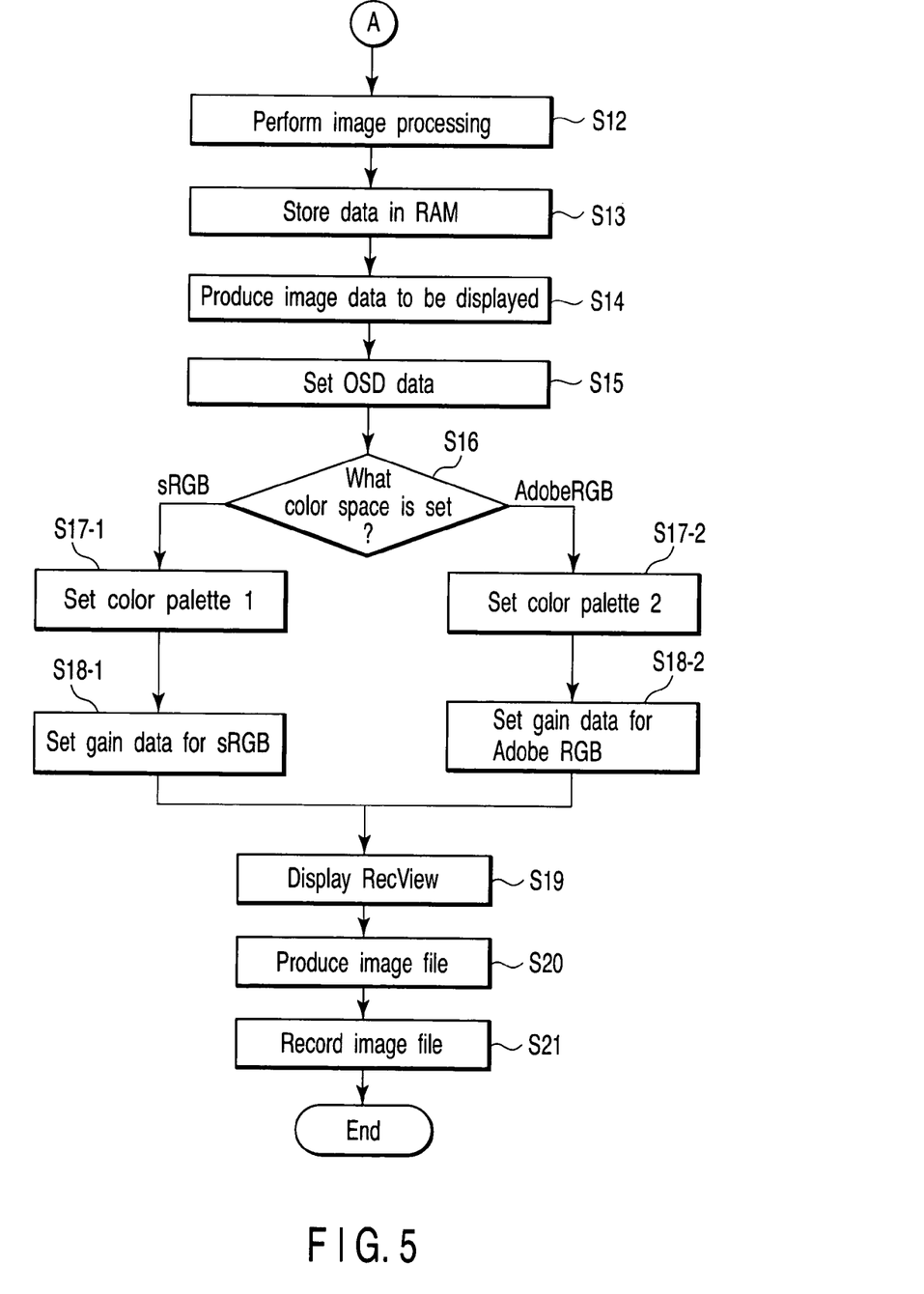
FIG. 5 is the second half of a flowchart for explaining an operation of the digital camera in a photographing time.

FIGS. 4 and 5 are flowcharts for explaining an operation of the digital camera in a photographing time. First, a moving picture "LiveView" to be displayed before taking a photograph is subjected to photographing control (Step S1). Then, image processing parameters for sRGB are set (Step S2). When the "LiveView" is displayed, the parameters are fixed to predetermined values. Then, the image processing circuit 13 performs image processing (Step S3) and the "LiveView" is displayed on the display apparatus 15 (Step S4). Thereafter, it is determined whether the release SW of the operation unit 16 is on (Step S5). If the determination in Step S5 is No, the operation returns to Step S1 and the digital camera waits until the release SW is turned on. When the release SW is turned on, the determination in Step S5 is YES, and control for taking a still image is carried out (Step S6). Then, fetched still image is subjected to processing, such as white balance (WB) processing, in the image processing circuit 13 (Step S7). Then, the setting discriminating section 17-1 discriminates setting conditions in the operation unit 16 (Step S8). Based on the discriminated setting conditions, the color space discriminating section 17-2 discriminates the color space settings, and outputs color space information (Step S9).

Then, the gain switching section 17-3 determines whether the color space information represents sRGB or ADOBE® RGB color image encoding (Step S10). If it is determined that the color space information represents sRGB, image processing parameters for sRGB are set (Step S11-1). If it is determined that the color space information represents ADOBE® RGB color image encoding in Step S10, image processing parameters for ADOBE® RGB color image encoding are set (Step S11-2). In Steps S11-1 and S11-2, a color conversion matrix, a gamma table, etc., corresponding to the color space are set to the image processing circuit 13. Then, the still image data fetched by the image processing circuit 13 is subjected to image processing (Step S12), and the processed image data is temporarily stored in the RAM 19 (Step S13).

Thereafter, the display processing circuit 14 reads the image data 19-2 from the RAM 19, and resizes it for display, thereby producing image data to be displayed (Step S14). Further, the display processing circuit 14 reads the OSD data 18-3 from the ROM 18, and sets it to the MIX section 14-2 (Step S15). The CPU 17 determines whether the color space information from the color space discriminating section 17-2 represents sRGB or ADOBE® RGB color image encoding (Step S16). If it is determined that the space information represents sRGB, the palette selecting section 14-1 selects the color palette 1 (18-1) (Step S17-1). Then, the gain switching section 17-3 sets the gain data 20-1 for sRGB (Step S18-1). If it is determined in Step S16 that the space information represents ADOBE® RGB color image encoding, the palette selecting section 14-1 selects the color palette 2 (18-2) (Step S17-2). Then, the gain switching section 17-3 sets the gain data 20-2 for ADOBE® RGB color image encoding (Step S18-2).

The amount of data in the color palette is much smaller than that of the OSD data. Therefore, the ROM stores a plurality of color palettes (not a plurality of OSD data sets), so that the display colors can be controlled by switching the color palettes. Thus, the memory amount can be relatively small.

Since the definition of the color space is broader in ADOBE® RGB color image encoding than in sRGB, the difference among R, G and B in one target object is smaller in ADOBE® RGB color image encoding. Therefore, if color conversion processing is not performed in accordance with the color space, the image taken under ADOBE® RGB color image encoding is displayed in a lower color saturation than that the image taken under sRGB. Therefore, according to the present invention, the gain for ADOBE® RGB color image encoding is set greater than that for sRGB, so that the images taken under both sRGB and ADOBE® RGB color image encoding can be displayed in substantially the same color saturation.

Then, a picture "RecView" for confirming a photographed image is displayed (Step S19). Thereafter, image data and header information are linked to produce image file data (Step S20). The produced image file data is recorded in the recording medium 22 (Step S21).

Figure 6:
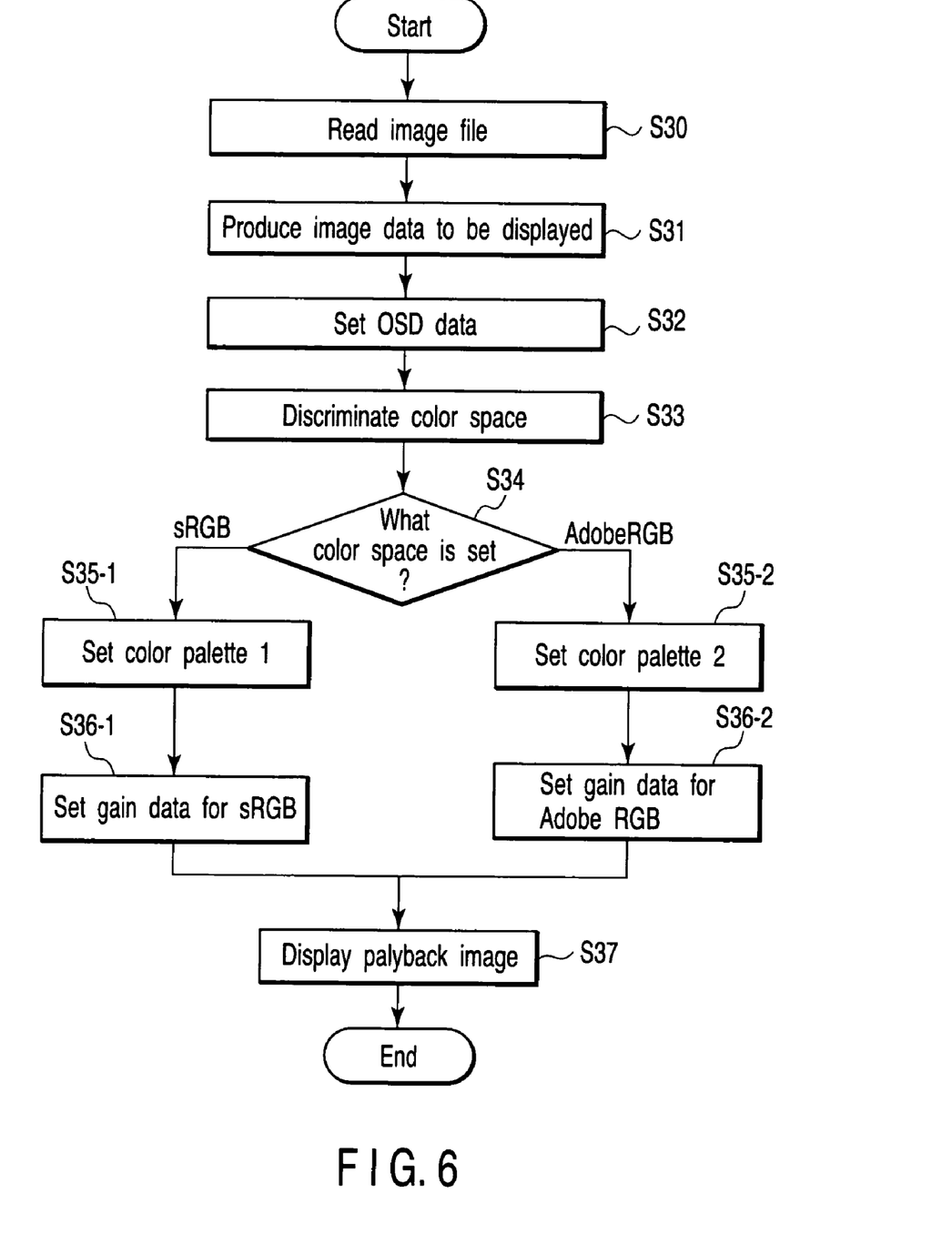
FIG. 6 is a flowchart for explaining an operation of the digital camera in an image playback time.

FIG. 6 is a flowchart for explaining an operation of the digital camera in an image playback time. First, image file data is read from the recording medium 22 and developed in the RAM 19 (Step S30). The image file data is resized for display, and image data to be displayed is produced (step S31). Then, OSD data is read from the ROM 18 and set (Step S32). Then, the color space discriminating section 17-2 discriminates color space based on the header of the image file data developed in the RAM 19, and outputs color space information (Step S33). Thereafter, it is determined whether the color space information represents sRGB or ADOBE® RGB color image encoding (Step S34). If it is determined that the space information represents sRGB, the palette selecting section 14-1 selects the color palette 1 (18-1) (Step S35-1). Then, the gain switching section 17-3 sets the gain data 20-1 for sRGB (Step S36-1). If it is determined that the space information represents ADOBE® RGB color image encoding, the palette selecting section 14-1 selects the color palette 2 (18-2) (Step S35-2). Then, the gain switching section 17-3 sets the gain data 20-2 for ADOBE® RGB color image encoding (Step S36-2). Finally, a playback image is displayed (Step S37).

In the present invention, the color of image data itself is not converted, and the color difference of a display image signal is amplified. Thus, color saturations of images can be substantially the same without involving a special color conversion circuit.

According to the above embodiment, even if image data represented under different color spaces are dealt with, images can be displayed in proper colors with a simple structure.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display control apparatus to display image data expressed under a plurality of different kinds of color spaces, the apparatus comprising:
    a discriminating section which discriminates a kind of a color space of image data based on color space information of the image data to be displayed;
    a memory which stores a display pattern comprised of on-screen display (OSD) data and a plurality of color palettes relating to the display pattern;
    a palette selecting section which selects a desired color palette from the plurality of color palettes relating to the display pattern based on the kind of the color space discriminated by the discriminating section;
    an OSD data generating section which generates display OSD data by converting the OSD data of the display pattern using the color palette selected by the palette selecting section;

a mixing section which mixes the display OSD data, generated by the OSD data generating section, with the image data, thereby generating display image data;

a gain switching section which switches gains to amplify the display image data mixed by the mixing section, in accordance with the kind of the color space discriminated by the discriminating section; and an amplifying section which amplifies the display image data based on the switched gain, wherein the amplifying section further comprises a separating section which separates the display image data into a luminance signal and a color difference signal, and amplifies only the color difference signal separated by the separating section based on the switched gain.

2. The display control apparatus according to claim 1, wherein the color space information is information recorded in a header of an image file, and the discriminating section discriminates the kind of the color space based on information recorded in the header.

3. The display control apparatus according to claim 1, wherein the color space information is a file name of a file including the image data to be displayed, and the discriminating section discriminates the kind of the color space based on the file name of the file including the image data.

4. The display control apparatus according to claim 1, wherein the color space information is a file management information including associating information of an image file to be displayed, and the discriminating section discriminates the kind of the color space based on the file management information.

5. The display control apparatus according to claim 1 further comprising:

an operation unit which sets a color space, wherein the discriminating section discriminates the kind of the color space based on information of the color space set by the operation unit.

6. The display control apparatus according to claim 1 further comprising:

a display unit which allows the color space information to be displayed therein.

7. The display control apparatus according to claim 1, wherein the gains in the gain switching section are preset as fixed values.

8. The display control apparatus according to claim 1, wherein the plurality of color palettes are set to display the display pattern in a suitable color saturation when the image signal is amplified by the amplifying section, after the color palette is mixed with the display image data.

9. The display control apparatus according to claim 1, wherein the gains which are switched by the gain switching section include a gain for sRGB and a gain for ADOBE® RGB that is greater than the gain for sRGB.

10. A display control method for displaying image data expressed under a plurality of different kinds of color spaces, the method comprising:

discriminating, via a discriminating section, a kind of a color space of image data based on color space information of the image data to be displayed;

storing, in a memory, a display pattern comprised of on-screen display (OSD) data and a plurality of color palettes relating to the display pattern;

selecting, via a palette selecting section, a desired color palette from the plurality of color palettes relating to the display pattern based on the kind of the color space discriminated by the discriminating section;

generating display OSD data, via an OSD data generating section, by converting the OSD data of the display pattern using the color palette selected by the palette selecting section;

mixing, via a mixing section, the display OSD data generated by the OSD data generating section with the image data, thereby generating display image data;

switching gains to select one of a plurality of gains to amplify the display image data mixed by the mixing section, in accordance with the kind of the color space discriminated by the discrimination section;

separating, via a separating section of an amplifying section, the display image data into a luminance signal and a color difference signal; and amplifying, via the amplifying section, only the color difference signal based on the selected one of the plurality of gains.

11. The display control method according to claim 10, wherein the color space information is information recorded in a header of an image file, and the discriminating section discriminates the kind of the color space based on information recorded in the header.

12. A display control method for displaying image data expressed under a plurality of different kinds of color spaces, the method comprising:

discriminating a kind of a color space of image data based on color space information of the image data to be displayed;

storing a display pattern comprised of on-screen display (OSD) data and a plurality of color palettes relating to the display pattern;

selecting a desired color palette from the plurality of color palettes relating to the display pattern based on the kind of the color space discriminated;

generating display OSD data by converting the OSD data of the display pattern using the color palette selected;

mixing the display OSD data with the image data, thereby generating display image data;

switching gains to select one of a plurality of gains to amplify the display image data, in accordance with the kind of the color space discriminated;

separating the display image data into a luminance signal and a color difference signal; and amplifying only the color difference signal based on the selected one of the plurality of gains.

* * * * *